(12) United States Patent
Lim et al.

(10) Patent No.: US 9,989,834 B2
(45) Date of Patent: Jun. 5, 2018

(54) CAMERA MODULE ASSEMBLY

(71) Applicant: Hanwha Techwin Co., Ltd., Changwon-si (KR)

(72) Inventors: Yong Seob Lim, Changwon-si (KR); Kazushige Tamura, Changwon-si (KR); Chang Yeon Kim, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 6 days.

(21) Appl. No.: 15/414,865

(22) Filed: Jan. 25, 2017

(65) Prior Publication Data

US 2017/0363933 A1     Dec. 21, 2017

(30) Foreign Application Priority Data

Jun. 17, 2016   (KR) .................. 10-2016-0075826

(51) Int. Cl.
*G03B 17/02* (2006.01)
*F16M 13/02* (2006.01)
*G03B 15/03* (2006.01)
*G03B 17/56* (2006.01)

(52) U.S. Cl.
CPC .............. *G03B 17/02* (2013.01); *F16M 13/02* (2013.01); *G03B 15/03* (2013.01); *G03B 17/561* (2013.01)

(58) Field of Classification Search
CPC ...... G03B 17/02; G03B 17/561; G03B 15/03; F16M 13/02

USPC ......................................................... 396/176
See application file for complete search history.

(56) References Cited

U.S. PATENT DOCUMENTS 4,728,839 A * 3/1988 Coughlan .............. F16M 11/18
                                                 248/183.4
7,364,128 B2   4/2008 Donaldson et al.

FOREIGN PATENT DOCUMENTS

| JP | 2015154441 A | 8/2015 |
| KR | 100585857 B1 | 6/2006 |
| KR | 100724306 B1 | 6/2007 |
| KR | 101305314 B1 | 9/2013 |

* cited by examiner

*Primary Examiner* — Christopher Mahoney
(74) *Attorney, Agent, or Firm* — Sughrue Mion, PLLC

(57) ABSTRACT

A camera module assembly includes: a camera module including a front surface and a rear surface, extending from the front surface to the rear surface, and including a lens on the front surface; a support bracket coupled to the camera module and including a front support portion adjacent to the front surface of the camera module and a rear support portion adjacent to the rear surface of the camera module; a light projecting portion arranged parallel to the camera module and including a light source configured to emit an infrared ray, and a main bracket having a cavity portion that accommodates the camera module and including a first bracket portion coupled to the support bracket and a second bracket portion coupled to the light projecting portion.

15 Claims, 6 Drawing Sheets

CAMERA MODULE ASSEMBLY

CROSS-REFERENCE TO THE RELATED APPLICATION

This application claims priority from Korean Patent Application No. 10-2016-0075826, filed on Jun. 17, 2016, in the Korean Intellectual Property Office, the disclosure of which is incorporated herein in its entirety by reference.

BACKGROUND

1. Field

Apparatuses consistent with exemplary embodiments relate to a camera module assembly, and more particularly, to a camera module assembly, which may improve positional accuracy and space use efficiency during assembly of a camera module.

2. Description of the Related Art

In general, a closed circuit television (CCTV) system that is a closed circuit monitoring system is installed in places such as houses, department stores, banks, exhibition halls, factories, etc. to prevent thefts or easily monitor a process flow or an operating state of machine.

In detail, in the CCTV system, images of a plurality of security zones to be managed are captured by using security cameras installed in each security zone, the captured images are transmitted to monitors installed in an office for surveillance through the monitors, and if necessary, only desired scenes are recorded by using a video cassette recorder (VCR).

The security camera may frequently operate 24 hours a day. While the security camera performs image capturing by using solar light during the daytime, it may perform the image capturing by using infrared light during the nighttime when securing a light source is difficult.

However, the above security camera according to a related art has a structure in which a space taken by a support portion of a camera portion and a support portion of an infrared lamp portion may be large, and thus, positional accuracy of the camera portion and the infrared lamp portion may not be sufficiently secured. Furthermore, since optical axes of the camera portion and/or the infrared lamp portion are not parallel to each other, a quality of an image captured at night may be deteriorated.

SUMMARY

One or more embodiments provide a camera module assembly, which may improve positional accuracy and space use efficiency during assembly of a camera module.

Various aspects of the inventive concept will be set forth in part in the description which follows and, in part, will be apparent from the description, or may be learned by practice of the presented exemplary embodiments.

According to one or more embodiments, there is provided a camera module assembly which may include: a camera module including a front surface and a rear surface, extending from the front surface to the rear surface, and including a lens on the front surface; a support bracket coupled to the camera module and including a front support portion adjacent to the front surface of the camera module and a rear support portion adjacent to the rear surface of the camera module; a light projecting portion arranged parallel to the camera module and including a light source configured to emit an infrared ray, and a main bracket having a cavity portion that accommodates the camera module and including a first bracket portion coupled to the support bracket and a second bracket portion coupled to the light projecting portion.

The front support portion may include at least two support pins located spaced apart from one another in a widthwise direction of the support bracket.

Each of the support pins may have a bent sectional shape.

The first bracket portion may have at least two insertion holes in which the support pins are inserted.

The rear support portion may have at least two support holes located spaced apart from one another in a widthwise direction of the support bracket.

The first bracket portion may include at least two protrusions extending in a direction toward the rear surface of the camera module and inserted in the support holes.

The support bracket may further include a middle support portion located between the front support portion and the rear support portion.

The rear support portion may have a pair of support holes located spaced apart from each other in a widthwise direction of the support bracket, and the middle support portion may have a middle through-hole located corresponding to a position between the pair of support holes.

The first bracket portion may have a middle screw hole to which a screw penetrating through the middle through-hole is coupled.

The rear support portion may have a pair of support holes located spaced apart from each other in the widthwise direction of the support bracket, the first bracket portion may include a pair of protrusions extending in a direction toward the rear surface of the camera module and inserted in the pair of support holes, and the middle screw hole may be located corresponding to a position between the pair of protrusions.

The second bracket portion may have an opening portion in which the light projecting portion is inserted.

The second bracket portion may have a shape of a frame encompassing the opening portion.

The light projecting portion may have a first through-hole, a second through-hole, and a third through-hole, and the third through-hole may be located corresponding to a position between the first through-hole and the second through-hole.

The first through-hole and the second through-hole may be located spaced apart from each other in a widthwise direction of the light projecting portion, and a distance between the third through-hole and the camera module may be longer than a distance between the camera module and each of the first through-hole and the second through-hole.

The second bracket portion may have a first screw hole, a second screw hole, a third screw hole, and a screw penetrating through the first through-hole may be coupled to the first screw hole, a screw penetrating through the second through-hole may be coupled to the second screw hole, and a screw penetrating through the third through-hole may be coupled to the third screw hole.

An optical axis of the camera module may be parallel to an optical axis of the light projecting portion.

The camera module assembly may further include a tilt driving portion configured to transfer a rotation force to the main bracket to rotate the main bracket in upper and lower directions, wherein the main bracket comprises a connection portion that is arranged at one side of the main bracket and connected to the tilt driving portion.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION

Figure 1:
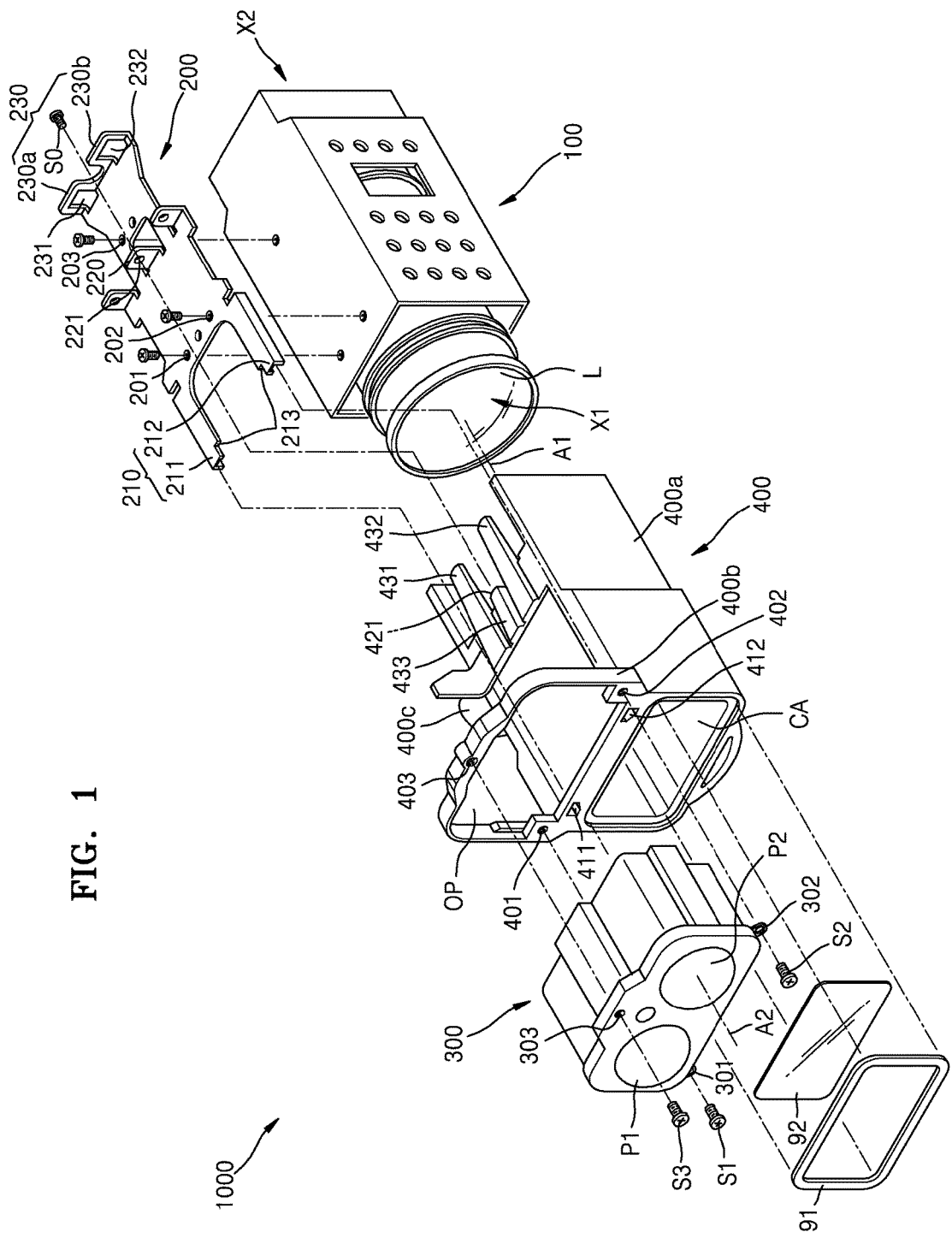
FIG. 1 is a schematic exploded perspective view of a camera module assembly, according to an exemplary embodiment.

The inventive concept is described in detail with reference to the accompanying drawings. However, the inventive concept is not limited thereto and it will be understood that various changes in form and details may be made therein without departing from the spirit and scope of the inventive concept. That is, descriptions on particular structures or functions may be presented merely for explaining exemplary embodiments of the inventive concept.

Terms such as "first" and "second" are used herein merely to describe a variety of constituent elements, but the constituent elements are not limited by the terms. Such terms are used only for the purpose of distinguishing one constituent element from another constituent element.

It will be understood that when a layer, region, or component is referred to as being "formed on" another layer, region, or component, it can be directly or indirectly formed on the other layer, region, or component. That is, for example, intervening layers, regions, or components may be present.

In the drawings, the thicknesses of multiple layers and regions are exaggerated for clarity. The thicknesses of some layers and regions in the drawings may be exaggerated for convenience of explanation. Like reference numerals in the drawings denote like elements, and thus their description will not be repeated.

Figure 2:
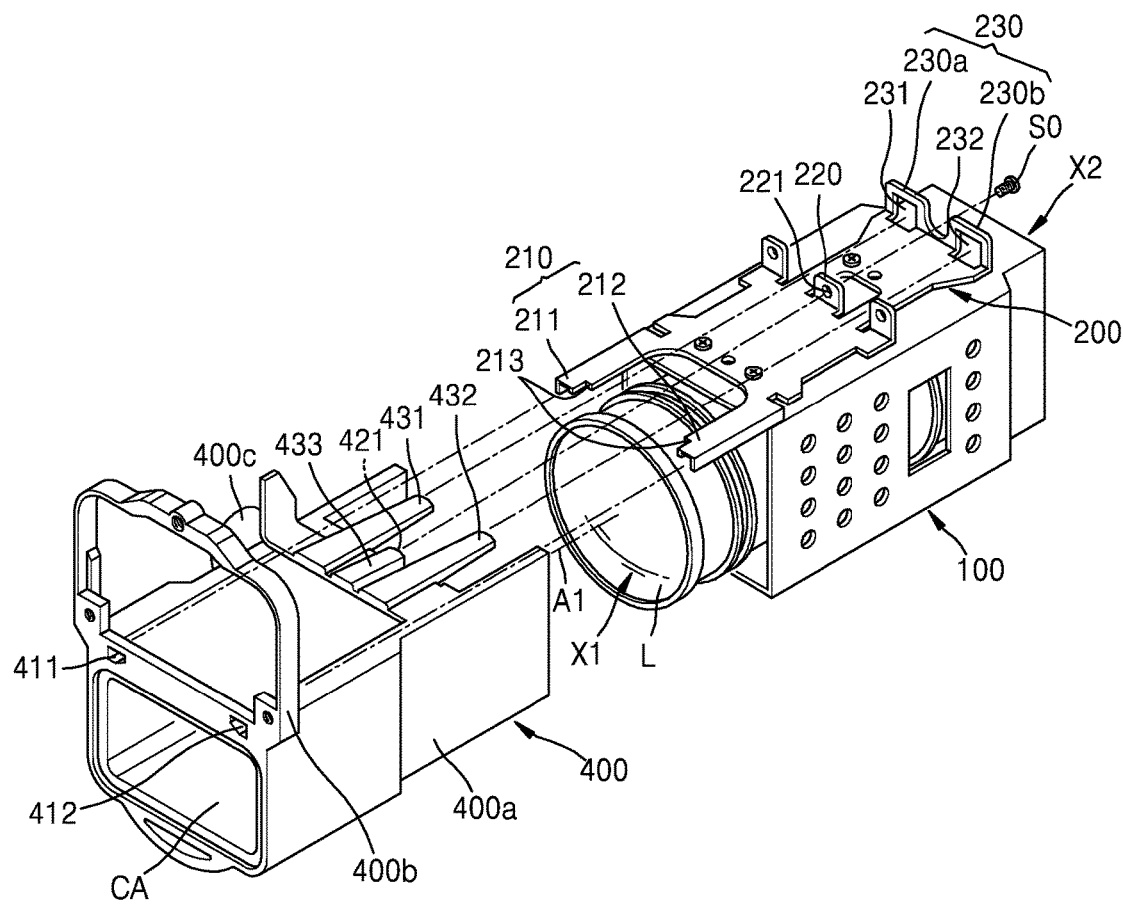
FIG. 2 is a schematic perspective view of the camera module assembly of FIG. 1, in which a camera module is assembled, according to an exemplary embodiment.
Figure 3:
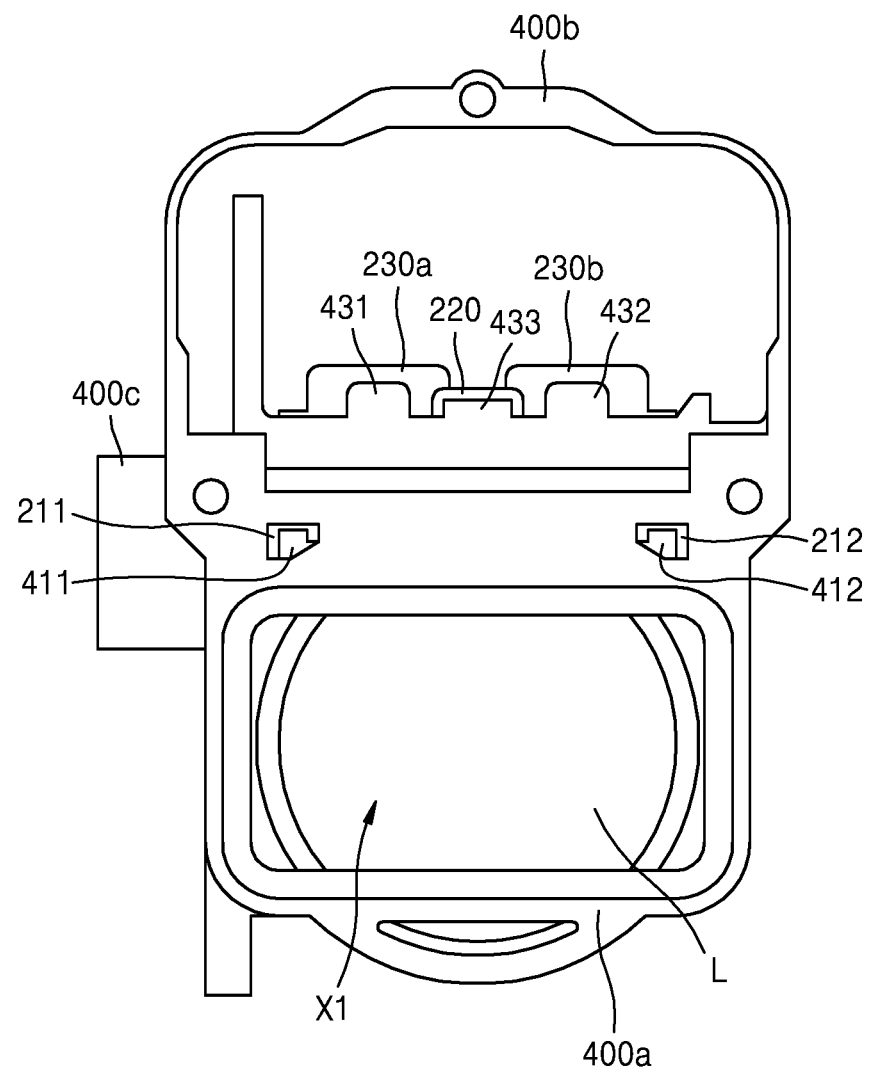
FIG. 3 is a schematic front view of the camera module assembly of FIG. 2, according to an exemplary embodiment.
Figure 4:
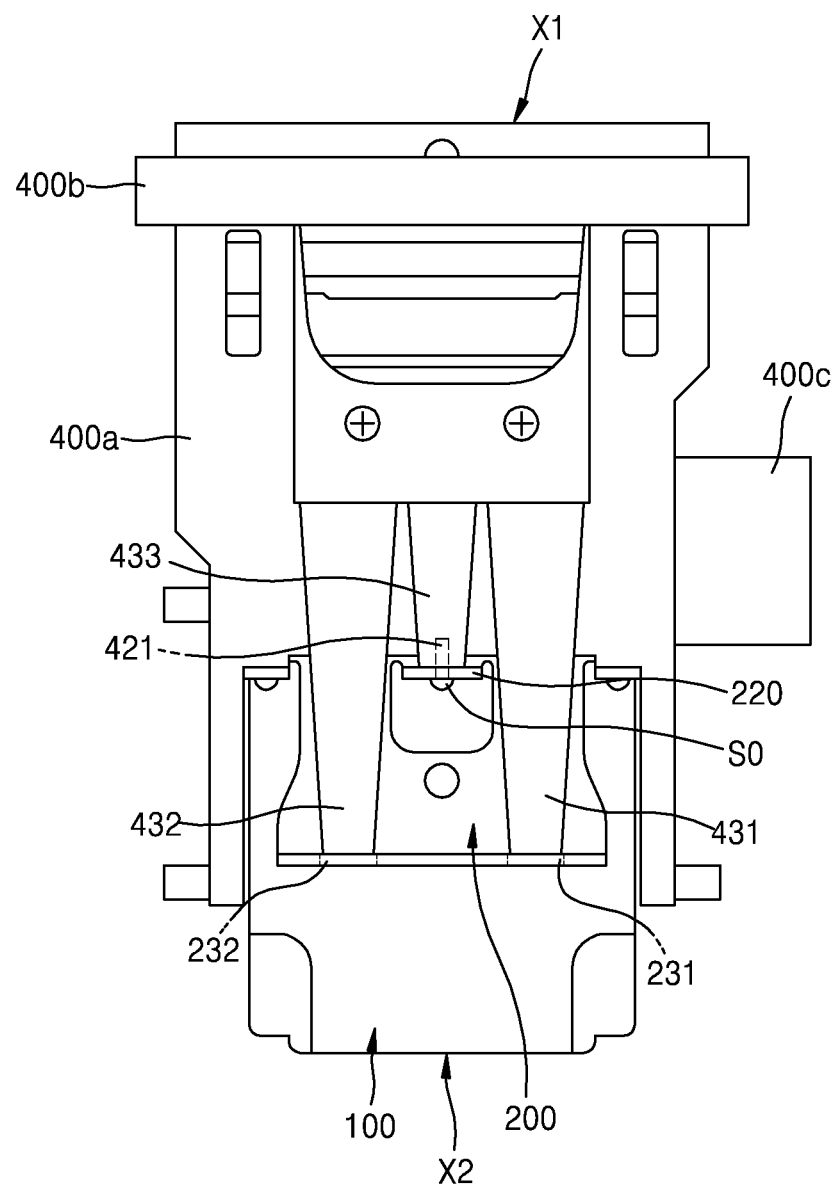
FIG. 4 is a schematic front view of the camera module assembly of FIG. 2, according to an exemplary embodiment.

FIG. 1 is a schematic exploded perspective view of a camera module assembly 1000, according to an exemplary embodiment. FIG. 2 is a schematic perspective view of the camera module assembly 1000 of FIG. 1, in which a camera module 100 is assembled, according to an exemplary embodiment. FIG. 3 is a schematic front view of the camera module assembly 1000 of FIG. 2, according to an exemplary embodiment. FIG. 4 is a schematic front view of the camera module assembly 1000 of FIG. 2, according to an exemplary embodiment.

First, referring to FIGS. 1 and 2, the camera module assembly 1000 according to the present exemplary embodiment may include the camera module 100, a support bracket 200, a light projecting portion 300, and a main bracket 400.

The camera module 100 includes a front side X1 and a rear side X2 that is opposite to the front side X1, and extends from the front side X1 toward the rear side X2. A lens L is provided at the front side X1 of the camera module 100. A barrel (not shown) for accommodating various lenses including the lens L may be arranged in the camera module 100. Also, the camera module 100 may include a casing portion (not referenced) that encompasses an outer surface of the barrel and protects inner parts of the camera module 100. The casing portion has a rectangular box shape, and thus, may be easily coupled to one flat surface of the support bracket 200.

The lens L provided at the front side X1 of the camera module 100 may be a zoom lens, and thus, the camera module 100 may perform a zoom operation by using the lens L. An image sensor (not shown) may be provided at the rear side X2 of the camera module 100. The image sensor detects contrast and color of a capture image and converts the contrast and color to electrical signals. The camera module 100 may include an image sensor printed circuit board (PCB) (not shown) to output or receive various signals including the electrical signals. For example, a complementary metal-oxide semiconductor (CMOS) sensor or a charge-coupled device (CCD) sensor may be used as the image sensor.

The support bracket 200 is coupled to one surface of the camera module 100. The support bracket 200 may include a front support portion 210 and a rear support portion 230. The front support portion 210 is located adjacent to the front side X1 of the camera module 100, and the rear support portion 230 is located adjacent to the rear side X2 of the camera module 100. Also, the support bracket 200 may further include a middle support portion 220 located between the front support portion 210 and the rear support portion 230. The camera module 100 may be firmly coupled to the main bracket 400 from the front side X1 to the rear side X2 by the front support portion 210, the middle support portion 220, and the rear support portion 230.

In detail, the front support portion 210 may include a pair of support pins 211 and 212. The support pins 211 and 212 may include the first support pin 211 and the second support pin 212. The first support pin 211 and the second support pin 212 are located spaced apart from each other in a widthwise direction of the support bracket 200. In an exemplary embodiment, the first support pin 211 and the second support pin 212 may protrude from one end of the support bracket 200 at the front side X1 in a lengthwise direction of the support bracket 200. Each of the first support pin 211 and the second support pin 212 may have a bent sectional shape. A bent sectional shape of the first support pin 211 and a bent sectional shape of the second support pin 212 may be symmetrical to each other with respect to a center line (not shown) extending in a thickness direction of the support bracket 200. Also, the front support portion 210 may include a stepped portion (not referenced) extending from each of the first support pin 211 and the second support pin 212 in a direction toward the rear side X2 and protruding inwardly to face each other.

Also, the rear support portion 230 may include a pair of support holes 231 and 232. The support holes 231 and 232 are the first support hole 231 and the second support hole 232, respectively. The first support hole 231 and the second support hole 232 are located spaced apart from each other in the widthwise direction of the support bracket 200. In an exemplary embodiment, the rear support portion 230 may include a first rear support portion 230a and a second rear support portion 230b. Each of the first rear support portion 230*a* and the second rear support portion 230*b* may protrude from the support bracket 200 in the thickness direction of the support bracket 200. The first rear support portion 230*a* and the second rear support portion 230*b* are located spaced apart from each other in the widthwise direction of the support bracket 200. The first support hole 231 may be formed at the center of the first rear support portion 230*a* by penetrating through the first rear support portion 230*a* in the lengthwise direction of the support bracket 200. The second support hole 232 may be formed at the center of the second rear support portion 230*b* by penetrating through the second rear support portion 230*b* in the lengthwise direction of the support bracket 200.

Also, the middle support portion 220 may include a middle through-hole 221. The middle through-hole 221 is located corresponding to a position between the first support hole 231 and the second support hole 232 of the rear support portion 230. In other words, the middle support portion 220 is located between the front support portion 210 and the rear support portion 230 in the lengthwise direction of the support bracket 200, and between the first rear support portion 230*a* and the second rear support portion 230*b* in the widthwise direction of the support bracket 200. In an exemplary embodiment, the middle support portion 220 may protrude from the support bracket 200 in the thickness direction of the support bracket 200. The middle through-hole 221 may be formed at the center of the middle support portion 220 by penetrating through the middle support portion 220 in the lengthwise direction of the support bracket 200. An additional support portions (not referenced) formed in a shape similar to the middle support portion 220 may be further be arranged at both sides of the middle support portion 220. As the additional support portions are screw-coupled to the main bracket 400, a coupling force between the support bracket 200 and the main bracket 400 may be further increased.

The support bracket 200 having the above-described structure may be screw-coupled to one surface of the camera module 100 by using screws. As illustrated in FIG. 1, a portion between the front support portion 210 and the middle support portion 220 of the support bracket 200 may be coupled to one surface of the camera module 100 by using a pair of screws 201 and 202. A portion between the middle support portion 220 and the rear support portion 230 of the support bracket 200 may be coupled to one surface of the camera module 100 by using a screw 203. As such, as the support bracket 200 and the camera module 100 are screw-coupled to each other at three points, the support bracket 200 and the camera module 100 may be firmly coupled to each other while reducing the number of coupling parts. However, the number of screws and the coupling positions of screws are not limited thereto, and thus, various numbers of screws may be used according to a design and the coupling positions of screws may be changed in various ways.

An assembly of the support bracket 200 and the camera module 100 as described above is coupled to a first bracket portion 400*a* of the main bracket 400. The support bracket 200 coupled to one surface of the camera module 100 corresponds to a portion directly coupled to the first bracket portion 400*a*. The first bracket portion 400*a* may have a cavity portion CA for accommodating the camera module 100. The cavity portion CA may have a shape corresponding to a casing portion (not referenced) arranged outside the camera module 100. For example, the cavity portion CA may have a shape similar to a shape of the interior of a rectangular parallelepiped corresponding to a rectangular box shape of the casing portion. Also, a cover glass 92 and a water-proof rubber 91 are coupled to a front end portion of the first bracket portion 400*a*, and thus, the lens L of the camera module 100 accommodated in the cavity portion CA may be protected from external shocks and rain. The front end portion of the first bracket portion 400*a* may represent a portion of the first bracket portion 400*a* that is located close to the front side X1 of the camera module 100 when the camera module 100 is accommodated in the cavity portion CA.

The first bracket portion 400*a* may include a pair of insertion holes 411 and 412. The insertion holes 411 and 412 are coupled to the front support portion 210 of the support bracket 200 and located in a front end portion of the main bracket 400. The front end portion of the main bracket 400 may represent a portion of the main bracket 400 that is located close to the front side X1 of the camera module 100 when the camera module 100 is accommodated in the cavity portion CA. In detail, the insertion holes 411 and 412 are located in the front end portion of the main bracket 400 between the cavity portion CA of the first bracket portion 400*a* and an opening portion OP of a second bracket portion 400*b*.

The insertion holes 411 and 412 may include the first insertion hole 411 and the second insertion hole 412. The first insertion hole 411 and the second insertion hole 412 are located spaced part from each other in a widthwise direction of the first bracket portion 400*a*. A separation distance between the first insertion hole 411 and the second insertion hole 412 may be the same as a separation distance between the first support pin 211 and the second support pin 212 of the support bracket 200. The first support pin 211 and the second support pin 212 are respectively inserted in the first insertion hole 411 and the second insertion hole 412. Accordingly, the sectional shapes of the first insertion hole 411 and the second insertion hole 412 correspond to the sectional shapes of the first support pin 211 and the second support pin 212. Also, each of the first insertion hole 411 and the second insertion hole 412 has a bent sectional shape.

Also, the first bracket portion 400*a* may include a pair of protrusions 431 and 432. The protrusions 431 and 432 are coupled to the rear support portion 230 of the support bracket 200 and located at a rear end portion of the main bracket 400. The rear end portion of the main bracket 400 may represent a portion of the main bracket 400 that is located close to the rear side X2 of the camera module 100 when the camera module 100 is accommodated in the cavity portion CA. The protrusions 431 and 432 extend in a direction toward the rear side X2 of the camera module 100 when the camera module 100 is accommodated in the cavity portion CA. The protrusions 431 and 432 may substantially extend as long as a distance between the middle support portion 220 of the camera module 100 and the rear support portion 230 of the camera module 100.

The protrusions 431 and 432 may include the first protruding portion 431 and the second protruding portion 432. The first protruding portion 431 and the second protruding portion 432 are located spaced apart from each other in the widthwise direction of the first bracket portion 400*a*. A separation distance between the first protruding portion 431 and the second protruding portion 432 may be the same as the separation distance between the first support hole 231 and the second support hole 232 of the support bracket 200. The first protruding portion 431 and the second protruding portion 432 are respectively inserted in the first support hole 231 and the second support hole 232. The separation distance between the first protruding portion 431 and the second protruding portion 432 may be different from the separation distance between the first support pin 211 and the second support pin 212. Accordingly, the separation distance between the first support hole 231 and the second support hole 232 may be different from the separation distance between the first support pin 211 and the second support pin 212. For example, the separation distance between the first protruding portion 431 and the second protruding portion 432 may be shorter than the separation distance between the first support pin 211 and the second support pin 212. Accordingly, the width of the rear support portion 230 having the first support hole 231 and the second support hole 232 may be smaller than the width of the front support portion 210 having the first support pin 211 and the second support pin 212.

Also, the first bracket portion 400a may include a middle screw hole 421 that is located at a position corresponding to a position between the first protruding portion 431 and the second protruding portion 432. The middle screw hole 421 is coupled to the middle support portion 220 of the support bracket 200 and located between the front end portion and the rear end portion of the main bracket 400. In an exemplary embodiment, the first bracket portion 400a may include a middle screw hole portion 433 located between the first protruding portion 431 and the second protruding portion 432. The middle screw hole 421 is formed at a center of the middle screw hole portion 433 to extend in a lengthwise direction of the first bracket portion 400a. A distance between protruding portions of the first and second protrusions 431 and 432 and the middle screw hole portion 433 may be substantially the same as a distance between the middle support portion 220 of the camera module 100 and the rear support portion 230 of the camera module 100.

A middle screw S0 is coupled to the middle screw hole 421. The middle screw S0 is coupled to the middle screw hole 421 by penetrating through the middle through-hole 221 provided in the middle support portion 220 of the support bracket 200. The middle support portion 220 of the support bracket 200 is coupled to the first bracket portion 400a.

The light projecting portion 300 is arranged parallel to the camera module 100 above the camera module 100. The light projecting portion 300 irradiates an infrared ray in a forward direction to perform an image capturing operation at night or in a dark place. In other words, the light projecting portion 300 may include a light source for emitting an infrared ray in the forward direction. In detail, a first light source P1 and a second light source P2 are arranged on a front surface of the light projecting portion 300. As the first light source P1 and the second light source P2 irradiate infrared rays in the forward direction, an image may be captured at night or in a dark place where natural light is insufficient.

The light projecting portion 300 may include a first through-hole 301, a second through-hole 302, and a third through-hole 303. The first, second, and third through-holes 301, 302, and 303 are arranged outside the first light source P1 and the second light source P2. Lines connecting the first, second, and third through-holes 301, 302, and 303 substantially form a triangle. In detail, the first through-hole 301 and the second through-hole 302 are located in portions of the light projecting portion 300 adjacent to the camera module 100 to be spaced apart from each other in the widthwise direction of the light projecting portion 300. The third through-hole 303 is located at a side opposite to the first through-hole 301 and the second through-hole 302 with respect to the light sources P1 and P2. Accordingly, the third through-hole 303 is located corresponding to a position between the first through-hole 301 and the second through-hole 302. A distance between the third through-hole 303 and the camera module 100 is longer than a distance between the camera module and each of the first through-hole 301 and the second through-hole 302.

The light projecting portion 300 is coupled to the second bracket portion 400b of the main bracket 400. The second bracket portion 400b may have the opening portion OP through which the light projecting portion 300 is inserted. The opening portion OP is located parallel to an entrance of the cavity portion CA of the first bracket portion 400a. Also, the second bracket portion 400b has a shape of a frame encompassing the opening portion OP. Accordingly, the second bracket portion 400b is coupled to the light projecting portion 300 by encompassing at least a part of an outer wall of the light projecting portion 300. In an exemplary embodiment, the front end portion of the light projecting portion 300 where the light sources P1 and P2 are arranged may protrude from the outer wall of the light projecting portion 300. Accordingly, when the light projecting portion 300 is inserted in the opening portion OP of the second bracket portion 400b, while the outer wall of the light projecting portion 300 passes through the opening portion OP, the protruding front end portion does not pass through the opening portion OP and is caught by one surface of the second bracket portion 400b.

Also, the second bracket portion 400b may include a first screw hole 401, a second screw hole 402, and a third screw hole 403. A first screw S1 that penetrates through the first through-hole 301 is coupled to the first screw hole 401. A second screw S2 that penetrates through the second through-hole 302 is coupled to the second screw hole 402. A third screw S3 that penetrates through the third through-hole 303 is coupled to the third screw hole 403. Accordingly, the positions of the first screw hole 401, the second screw hole 402, and the third screw hole 403 respectively correspond to the positions of the first through-hole 301, the second through-hole 302, and the third through-hole 303.

Next, a process in which the camera module 100 is assembled to the first bracket portion 400a is described in detail with reference to FIGS. 2, 3, and 4.

Prior to describing a detailed assembly process, referring to FIGS. 3 and 4, the main bracket 400 may include a connection portion at one side thereof. The connection portion 400c has a cylindrical axis shape and may be connected to a tilt driving portion (not shown) for transferring a rotation force to the main bracket 400. As such, as the connection portion 400c is connected to the tilt driving portion, the main bracket 400 may be rotated in upper and lower directions by the rotation force received from the tilt driving portion. The rotating in the upper and lower directions represents rotating around a center line (not shown) passing through the center of the connection portion 400c, as a rotation axis. In an exemplary embodiment, the connection portion 400c may be arranged one side surface of an outer wall of the first bracket portion 400a.

Referring to FIGS. 2 and 3, the first and second support pins 211 and 212 provided in the front support portion 210 of the support bracket 200 are respectively inserted in the first and second insertion holes 411 and 412 provided in the front end portion of the first bracket portion 400a. In detail, the first support pin 211 located close to the connection portion 400c is inserted in the first insertion hole 411. The second support pin 212 located spaced apart from the first support pin 211 in the widthwise direction of the first bracket portion 400a is inserted in the second insertion hole 412. As bent end portions of the first support pin 211 and the second support pin 212 are inserted in the first insertion hole 411 and the second insertion hole 412, the front support portion 210 may be firmly coupled to the first bracket portion 400a. Also, as the front support portion 210 includes a stepped portion 213 extending from each of the first support pin 211 and the second support pin 212, an amount of insertion of each of the first support pin 211 and the second support pin 212 may be restricted by the stepped portion 213.

Referring to FIGS. 2 and 4, the protrusions 431 and 432 located at the rear end of the first bracket portion 400a are respectively inserted in the support holes 231 and 232 provided in the rear support portion 230 of the support bracket 200. In detail, the first protruding portion 431 located close to the connection portion 400c is inserted in the first support hole 231. The second protruding portion 432 located spaced apart from the first protruding portion 431 in the widthwise direction of the first bracket portion 400a is inserted in the second support hole 232.

Also, the middle screw S0 is coupled to the middle screw hole 421 by penetrating through the middle through-hole 221 provided in the middle support portion 220 of the support bracket 200. The middle screw hole 421 is formed in the middle screw hole portion 433 located between the first protruding portion 431 and the second protruding portion 432. As such, since the middle screw S0 penetrating through the middle through-hole 221 is coupled to the middle screw hole 421 in a state in which the first protruding portion 431 and the second protruding portion 432 are respectively inserted in the first support hole 231 and the second support hole 232, the rear support portion 230 and the middle support portion 220 may be firmly coupled to the first bracket portion 400a.

As described above, the camera module 100 is coupled to the first bracket portion 400a in a direction in which the front side X1 of the camera module 100 is inserted in the cavity portion CA ahead of the rear side X2. The support bracket 200 and the first bracket portion 400a are assembled to each other at two positions of the front support portion 210, two positions of the rear support portion 230, and one position of the middle support portion 220. Accordingly, while the camera module 100 is stably accommodated in the first bracket portion 400a, positional accuracy of the camera module 100 with respect to the first bracket portion 400a may be improved. Also, as the above coupling positions are uniformly distributed along the lengthwise direction of the camera module 100, misalignment of an optical axis A1 of the lens L of the camera module 100 to the first bracket portion 400a may be reduced.

Next, a process in which the light projecting portion 300 is assembled to the second bracket portion 400b is described in detail with reference to FIGS. 5 and 6.

Figure 5:
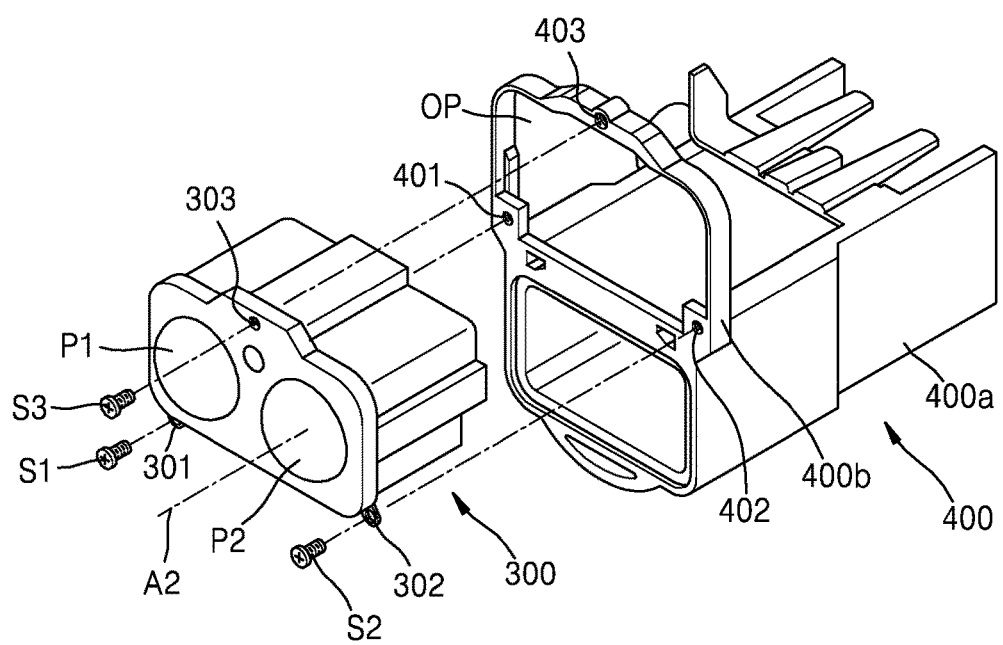
FIG. 5 is a schematic perspective view of the camera module assembly of FIG. 1, in which a light projecting portion is assembled, according to an exemplary embodiment.

FIG. 5 is a schematic perspective view of the camera module assembly 1000 of FIG. 1, in which the light projecting portion 300 is assembled, according to an exemplary embodiment. FIG. 6 is a schematic front view of the camera module assembly 1000 of FIG. 5, according to an exemplary embodiment.

Figure 6:
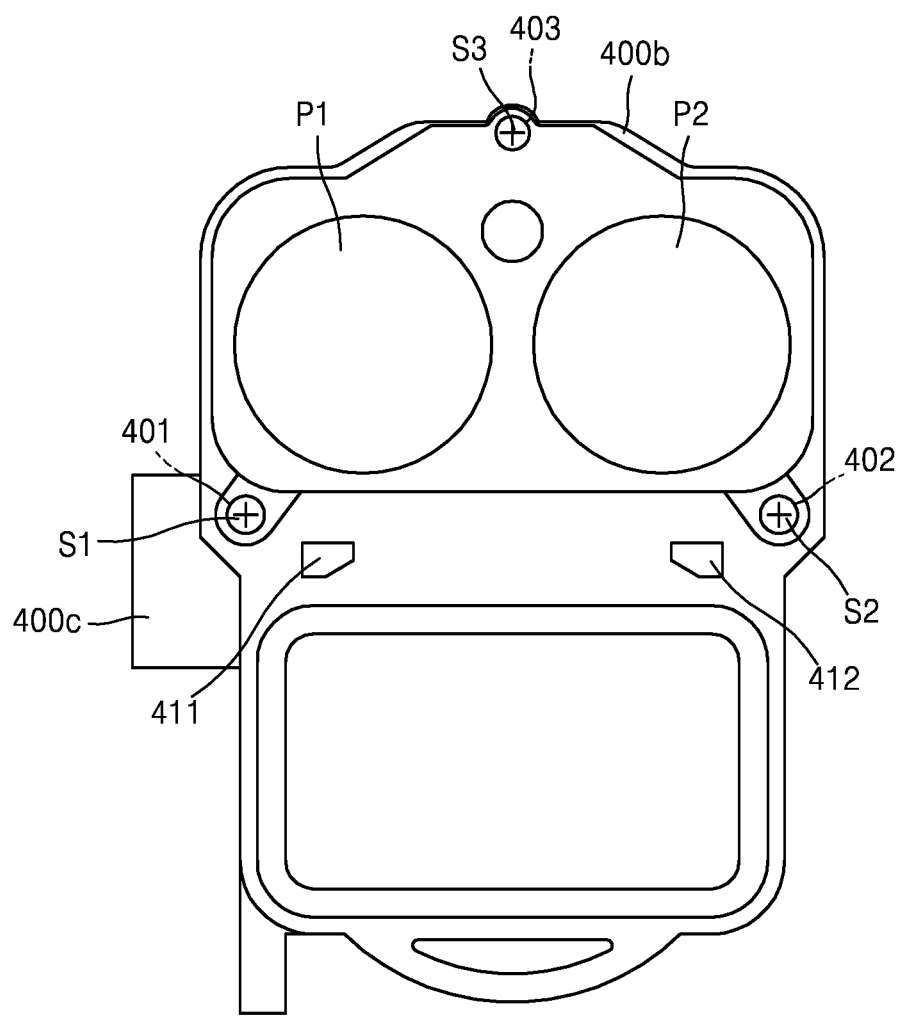
FIG. 6 is a schematic front view of the camera module assembly of FIG. 5, according to an exemplary embodiment.

Referring to FIGS. 5 and 6, as the first to third screws S1, S2, and S3 respectively penetrating through the first to third through-holes 301, 302, and 303 provided in the light projecting portion 300 are respectively inserted in the first to third screw holes 401, 402, and 403 of the second bracket portion 400b, the light projecting portion 300 and the second bracket portion 400b are coupled to each other. In detail, the first screw S1 penetrating through the first through-hole 301 is coupled to the first screw hole 401 close to the connection portion 400c. The second screw S2 penetrating through the second through-hole 302 is coupled to the second screw hole 402 spaced apart from the first screw hole 401 in the widthwise direction of the light projecting portion 300. The third screw S3 penetrating through the third through-hole 303 is coupled to the third screw hole 403 located above the first screw hole 401 and the second screw hole 402. Accordingly, the light projecting portion 300 is coupled to the second bracket portion 400b in a direction in which the rear end portion of the light projecting portion 300 is inserted ahead of the front end portion thereof in the opening portion OP of the second bracket portion 400b. The rear end portion of the light projecting portion 300 may represent an end portion opposite to the portion of the light projecting portion 300 where the first light source P1 and the second light source P2 are arranged.

Accordingly, as the light projecting portion 300 and the second bracket portion 400b are assembled to each other at the three positions located on the light projecting portion 300, positional accuracy of the light projecting portion 300 with respect to the second bracket portion 400b may be improved. Also, as the three positions are located in the front end portion of the light projecting portion 300, misalignment of an optical axis A2 of the first light source P1 and the second light source P2 arranged in the front end portion of the light projecting portion 300 to the second bracket portion 400b may be reduced.

As described above, as the misalignment of the optical axis A2 of the light projecting portion 300 and the misalignment of the optical axis A1 of the camera module 100 are reduced, the optical axis A1 of the camera module 100 may be approximately parallel to the optical axis A2 of the light projecting portion 300. Accordingly, a viewing angle range of the camera module 100 and an infrared emission range of the light projecting portion 300 are almost matched with each other and thus a quality captured image may be obtained even in a dark environment.

As the camera module 100 and the light projecting portion 300 are arranged to be compact by using the main bracket 400 having the above-described structure, the camera module assembly 1000 of FIG. 1 may have an extra space. Although not illustrated in FIG. 1, parts such as a main PCB (not shown) or a blower portion (not shown) may be additionally provided at a side of the main bracket 400 opposite to the side where the connection portion 400c is arranged. Accordingly, as the main PCB that is a heat radiation source of the camera module assembly 1000 is arranged in the extra space, heat radiation performance may be improved. Also, as the blower portion is arranged close to the cover glass 92, a condensation phenomenon occurring on the cover glass 92 may be prevented by air blowing and/or heating.

As described above, according to the present exemplary embodiment, a camera module assembly having improved positional accuracy and space use efficiency during assembly of a camera module may be implemented. Also, a camera module assembly having an improved assembly feature may be implemented by reducing the number of coupling parts such as screws or bolds. The present inventive concept is not limited to the above exemplary embodiments.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A camera module assembly comprising:
a camera module comprising a front surface and a rear surface, extending from the front surface to the rear surface, and comprising a lens on the front surface;
a support bracket coupled to the camera module and comprising a front support portion adjacent to the front surface of the camera module and a rear support portion adjacent to the rear surface of the camera module;
a light projecting portion arranged parallel to the camera module and comprising a light source configured to emit a light ray; and
a main bracket having a cavity portion that accommodates the camera module and comprising a first bracket portion coupled to the support bracket and a second bracket portion coupled to the light projecting portion,
wherein the rear support portion has at least two support holes located spaced apart from one another in a widthwise direction of the support bracket, and
wherein the first bracket portion comprises at least two protrusions extending in a direction toward the rear surface of the camera module and inserted in the support holes.

2. The camera module assembly of claim 1, wherein the front support portion comprises at least two support pins located spaced apart from one another in a widthwise direction of the support bracket.

3. The camera module assembly of claim 2, wherein each of the support pins has a bent sectional shape.

4. The camera module assembly of claim 2, wherein the first bracket portion has at least two insertion holes in which the support pins are inserted.

5. The camera module assembly of claim 1, wherein the support bracket further comprises a middle support portion located between the front support portion and the rear support portion.

6. The camera module assembly of claim 5, wherein the rear support portion has a pair of support holes located spaced apart from each other in a widthwise direction of the support bracket, and the middle support portion has a middle through-hole located corresponding to a position between the pair of support holes.

7. The camera module assembly of claim 6, wherein the first bracket portion has a middle screw hole to which a screw penetrating through the middle through-hole is coupled.

8. The camera module assembly of claim 7,
wherein the first bracket portion comprises a pair of protrusions extending in a direction toward the rear surface of the camera module and inserted in the pair of support holes, and
wherein the middle screw hole is located corresponding to a position between the pair of protrusions.

9. The camera module assembly of claim 1, wherein the second bracket portion has an opening portion in which the light projecting portion is inserted.

10. The camera module assembly of claim 9, wherein the second bracket portion has a shape of a frame encompassing the opening portion.

11. The camera module assembly of claim 1, wherein the light projecting portion has a first through-hole, a second through-hole, and a third through-hole, and the third through-hole is located corresponding to a position between the first through-hole and the second through-hole.

12. The camera module assembly of claim 11, wherein the first through-hole and the second through-hole are located spaced apart from each other in a widthwise direction of the light projecting portion, and a distance between the third through-hole and the camera module is longer than a distance between the camera module and each of the first through-hole and the second through-hole.

13. The camera module assembly of claim 11, wherein the second bracket portion has a first screw hole, a second screw hole, and a third screw hole, a screw penetrating through the first through-hole is coupled to the first screw hole, a screw penetrating through the second through-hole is coupled to the second screw hole, and a screw penetrating through the third through-hole is coupled to the third screw hole.

14. The camera module assembly of claim 1, wherein an optical axis of the camera module is parallel to an optical axis of the light projecting portion.

15. The camera module assembly of claim 1, further comprising a tilt driving portion configured to transfer a rotation force to the main bracket to rotate the main bracket in upper and lower directions,
wherein the main bracket comprises a connection portion that is arranged at one side of the main bracket and connected to the tilt driving portion.

* * * * *